United States Patent
Ishikawa et al.

(10) Patent No.: US 8,033,108 B2
(45) Date of Patent: Oct. 11, 2011

(54) TWO-STAGE SUPERCHARGING SYSTEM FOR INTERNAL COMBUSTION ENGINE

(75) Inventors: Naoya Ishikawa, Fujisawa (JP); Junichiro Nitta, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 783 days.

(21) Appl. No.: 12/084,877

(22) PCT Filed: Sep. 25, 2006

(86) PCT No.: PCT/JP2006/318933
§ 371 (c)(1),
(2), (4) Date: May 12, 2008

(87) PCT Pub. No.: WO2007/058017
PCT Pub. Date: May 24, 2007

(65) Prior Publication Data
US 2009/0255517 A1    Oct. 15, 2009

(30) Foreign Application Priority Data
Nov. 18, 2005    (JP) .................................. 2005-334343

(51) Int. Cl.
*F02B 33/44*    (2006.01)
(52) U.S. Cl. .............................. 60/602; 60/612; 123/562
(58) Field of Classification Search .................... 60/602, 60/612; 123/562
See application file for complete search history.

(56) References Cited

U.S. PATENT DOCUMENTS

| 4,930,315 A | 6/1990 | Kanesaka |
| 5,408,979 A | 4/1995 | Backlund et al. |
| 6,732,522 B2 * | 5/2004 | Wright et al. .................. 60/602 |
| 7,426,831 B2 * | 9/2008 | Grissom ......................... 60/612 |

FOREIGN PATENT DOCUMENTS

| DE | 3818241 A1 | 12/1988 |
| EP | 1306534 | 5/2003 |
| EP | 1387063 | 2/2004 |
| EP | 1679429 | 7/2006 |
| GB | 2205606 | 12/1988 |
| JP | 61-277818 | 12/1986 |
| JP | 1-142214 | 6/1989 |
| JP | 5-508461 | 11/1993 |
| JP | 11-44219 | 2/1999 |
| WO | WO 91/18192 | 11/1991 |

OTHER PUBLICATIONS

International Search Report mailed Oct. 17, 2006 in connection with the International application PCT/JP2006/318933.
Extended European Search Report dated Oct. 4, 2010 in Appln. No. 06810501.4.

* cited by examiner

*Primary Examiner* — Mary A Davis
(74) *Attorney, Agent, or Firm* — Staas & Halsey LLP (57) ABSTRACT

A sequential-type, two-stage supercharging system (1) having a high-pressure-stage turbocharger (6) and a low-pressure-stage turbocharger (5), in which high-pressure-stage exhaust gas bypass passages (6d, 6e) for bypassing a high-pressure-stage turbine (6t) is formed by both the first bypass passage (6d) having a small-diameter valve (6f) and the second bypass passage (6e) having a large-diameter valve (6g) with a diameter greater than that of the small-diameter valve (6f). The effective valve area of the small-diameter valve (6f) is set to 9.5%-26.5% of the passage cross-sectional area required when exhaust gas is at its maximum total flow rate. This allows, in medium speed/medium load operation, fine EGR rate control and air-fuel ratio control.

3 Claims, 12 Drawing Sheets

EGR Ratio (%)

Fig.12

EGR Ratio (%)

TWO-STAGE SUPERCHARGING SYSTEM FOR INTERNAL COMBUSTION ENGINE

CROSS REFERENCE TO RELATED APPLICATIONS

This application claims the benefit under 35 U.S.C. Section 371, of PCT International Application Number PCT/JP2006/318933, filed Sep. 25, 2006 and Japanese Application No. 2005-334343 filed Nov. 18, 2005 in Japan, the contents of all of which are incorporated herein by reference.

BACKGROUND OF THE INVENTION

1. Field of the Invention

The present invention relates to a two-stage supercharging system for an internal combustion engine provided with a high-pressure-stage turbocharger and low-pressure-stage turbocharger capable of finely controlling an EGR rate and air-fuel ratio.

2. Description of the Related Art

As for supercharging of the internal combustion engine, for the purpose of expanding an operation region of an exhaust turbocharger, waste gate turbocharger, variable capacity turbocharger, and so on have been developed. However, when trying to obtain a high pressure ratio (high supercharging pressure) with one supercharger in a wide range of rotation region of the internal combustion engine, since operation efficiency is lowered because of characteristics of turbochargers and the range of operation flow rate reduces because a surge is easy to occur, there is a limit to the high pressure ratio.

Therefore, for the purpose of obtaining high supercharging pressure by multi-stage pressure rising and operation efficiency improving of the supercharger, the two-stage supercharging system is used. In the two-stage supercharging system, two superchargers are serially arranged in two stages and pressure is risen by dividing intake air into two stages, low-pressure-stage and high-pressure-stage. Thus, by reducing rising pressure ratio at each single stage, operation efficiency is improved.

One of the two-stage supercharging systems is a series type two-stage supercharging system. In this system, basically it is assumed that both low-pressure-stage and high-pressure-stage should be simultaneously used and no operation control is required for the high-pressure-stage exhaust turbine by the flow rate control of the exhaust gas.

When combining a reciprocation-type internal combustion engine having a wide operation range with an exhaust turbocharger having a narrow operation range in the system, since effective supercharging is limited to a special operation region because of the characteristics of the both, an exhaust turbine is matched by adjusting the operation region to the output point of the internal combustion engine.

However, there is a problem with the system that when the operation condition of the internal combustion engine is under low-speed and low-load region, exhaust pressure and exhaust flow rate is not enough. In addition, there are other problems that since the capacity of the turbocharger is too large to sufficiently function, high supercharging pressure (high boost) cannot be obtained or response delay may be increased.

Another two-stage supercharging system is a sequential-type supercharging system. In the system two turbochargers having extremely different capacities to each together are serially arranged and a bypass is provided so that a suitable supercharger can be selected according to operation conditions of the internal combustion engine. Thereby, operation region as a supercharging system is expanded.

Unlike the series-type two-stage supercharging system, when in a high-speed rotation and high-load region, the system uses a large capacity low-pressure-stage turbocharger suitable for the operation region to perform supercharging, which is the same or more than the single-stage supercharging system of conventional techniques. On the other hand, in the low-speed to medium-speed rotation, using a small-capacity high-pressure-stage turbocharger instead of low-pressure-stage turbocharger, supercharging is performed.

With this system, by making the capacities between low-pressure-stage and high-pressure-stage turbochargers have a large difference, it becomes possible to supercharge even in a difficult-to-supercharging operation region for the series-type two-stage supercharging system.

In the system under a full load operation, when a small-capacity high-pressure-stage turbine is operated, the exhaust pressure increases. Therefore, under some operation conditions, all exhaust gas has to be made flow into the low-pressure-stage turbine by bypassing the high-pressure-stage turbine. As a result, according to operation conditions, low-pressure-stage and high-pressure-stage turbochargers are switched for use.

By using a small flow rate high-pressure-stage turbo under a low-speed and low-load operation, the system realizes high supercharging and high EGR rate, and further realizes low NOx and low soot combustion. Moreover, since high response is obtained by the turbine inertia becoming smaller, there is no turbo lag at the time of acceleration, so that drivability is also improved. Under a high-speed and high-load operation, by switching to the low-pressure-stage turbo having the same size as the sequential type, deterioration of engine performance can be avoided.

However, when operation conditions of the internal combustion engine is in a low-speed rotation region, all exhaust gas has to be sent to the high-pressure-stage turbine in order to obtain a required supercharging pressure. When in a medium-speed rotation region, since supercharging is conducted using both low-pressure-stage and high-pressure-stage turbochargers, the exhaust gas flow rate sent to both high-pressure-stage and low-pressure-stage turbines has to be precisely controlled.

Therefore, in this system, a high-pressure-stage exhaust bypass passage and a bypass valve for flow rate control therein are provided. The bypass valve is required such that while under the operation condition that the exhaust gas flow rate is large, the valve has flow rate characteristics that all exhaust gas can be flown without causing an increase of the exhaust pressure, the exhaust gas flow of the high-pressure-stage turbine can be controlled under the small to medium flow rate operation condition of the exhaust gas.

However, since high temperature exhaust gas as high as 800° C. flows in the high-pressure-stage exhaust bypass passage, production of a bypass valve for flow rate control is technically very difficult, which can secure circulation of a great flow amount of exhaust gas at the time of high-speed and high-load operation and at the same time can control small amount of gas at the time of low-speed and low-load operation. Consequently, there is a problem that in the sequential type two-stage supercharging system, it is difficult to precisely control the flow rate of the exhaust gas flowing into the high-pressure-stage turbine to conduct a suitable supercharging in each operation condition according to operation conditions of the internal combustion engine.

As a countermeasure for it, for example, a supercharging pressure control device having a two-stage turbo supercharging engine is proposed like the description of Japanese Patent Application Kokai Publication No. S61-277818. With the device, in the two-stage turbo supercharging engine, two bypass valves, primary and secondary, having different diameters of valves are provided in parallel in the exhaust bypass passage detouring the exhaust turbine of the high-pressure-stage turbocharger. As for the secondary bypass valve having a small diameter, valve opening is adjusted and controlled according to the change of output pressure of the high-pressure-stage compressor in the low- and medium-speed range of the engine with its pressure being a target. At the same time, after the output pressure of the low-pressure-stage compressor reaches a target in the high-speed region of the engine, the primary bypass valve having a large diameter immediately fully opens to be switched into a single-stage supercharging by the low-pressure-stage turbocharger.

With the configuration above, the following effects are assumed to be produced. Since the pressure can be precisely adjusted to a target by a minute opening and closing operation of the secondary bypass valve, pressure fluctuation by such as hunting can be prevented like pressure regulating operation by the main bypass valve with a large diameter. When the output pressure of the low-pressure-stage compressor reaches a target, the primary bypass valve is immediately moved to the full-open position to be switched to a single stage supercharging. Thus, a suitable role is taken for primary and secondary valves, respectively, so that regulation of pressure and switching operation can be smoothly and securely conducted.

However, in the supercharging pressure control device of the two-stage turbo supercharging engine, suitable dimensions are not shown for a large-diameter primary bypass valve and small-diameter secondary bypass valve, so that it is not possible to perform practical flow rate control of the exhaust gas only by the information above.

For example, in the two-stage turbo supercharging engine, when performing EGR, air-fuel ratio (A/F) and EGR rate are controlled within a small range of equal to or less than 0.1 and 1%, respectively. As a result, there occurs a problem that when configuring a valve opening effective area necessary for making maximum exhaust gas flow rate bypass at full load without any difficulty with an appropriate ratio, control precision becomes poor in an infinitesimal angle region, so that fine EGR rate control and air-fuel ratio control cannot be conducted.

Patent document 1: Japanese Patent application Kokai Publication No. S61-277818

SUMMARY OF THE INVENTION

The present invention aims at solving the problems above. The object of the invention is to provide a two-stage supercharging system for the internal combustion engine using both high-pressure-stage and low-pressure-stage turbochargers in the medium speed and medium load operation and at the same time being capable of adjusting and controlling the exhaust gas flow rate bypassing the high-pressure-stage turbocharger with high precision and conducting fine EGR rate control and air-fuel ratio control in the sequential type two-stage supercharging system provided with the high-pressure-stage and low-pressure-stage turbochargers.

The two-stage supercharging system for achieving the above object provides a low-pressure-stage compressor of the low-pressure-stage turbocharger and high-pressure-stage compressor of the high-pressure-stage turbocharger from the upstream of an intake air passage of the internal combustion engine in order. At the same time, the system provides a high-pressure-stage turbine of the high-pressure-stage turbocharger and low-pressure-stage turbine of the low-pressure-stage turbocharger from the upstream of the exhaust passage in order, and a high-pressure-stage intake air bypass passage bypassing the high-pressure-stage compressor and high-pressure-stage exhaust bypass passage bypassing the high-pressure-stage turbine. And in the two-stage supercharging system for the internal combustion engine, in which the high-pressure-stage exhaust bypass passage is formed by a first bypass passage provided with a small-diameter valve and a second bypass passage provided with a large-diameter valve larger than the small-diameter valve, a valve effective area of the small-diameter valve is configured to be in a range of 9.5% to 26.5% of a necessary passage cross sectional area at the time of the maximum total flow rate of the exhaust gas.

Figure 2:
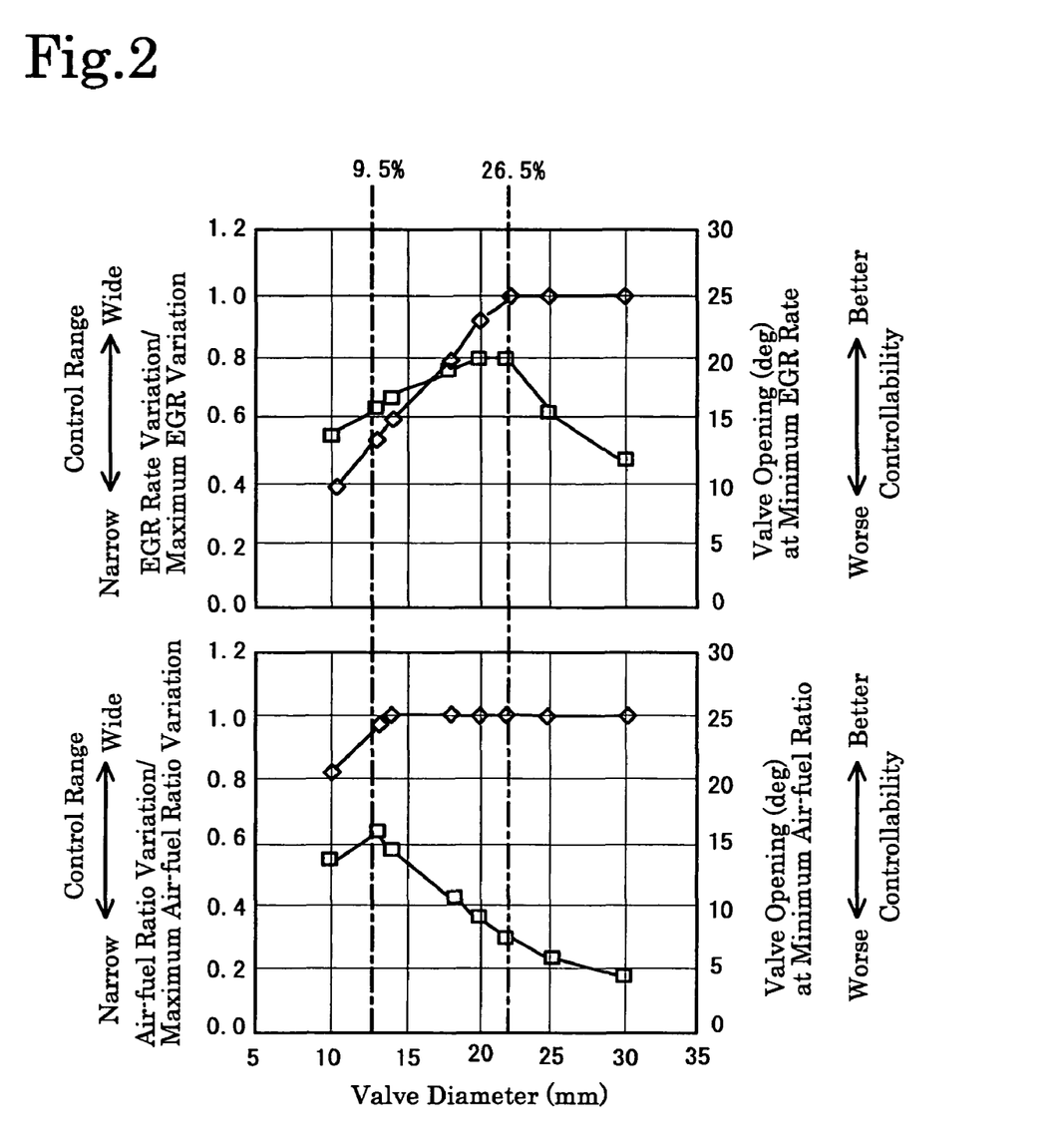
FIG. 2 is a diagram showing relations of a valve diameter of a small-diameter valve versus variations of the EGR rate and air-fuel ratio, and valve opening.

The value in a range of 9.5% to 26.5% is derived from FIG. 2. In FIG. 2, horizontal axis is a valve diameter, and vertical axis denotes a normalized value ($\diamond$: diamond shape) by dividing variations of EGR rate and air-fuel ratio by maximum variations, respectively. Further, it denotes valve openings ($\square$: square) when EGR rate and air-fuel ratio become minimum, respectively. From FIG. 2, the range of the valve diameter is 13 mm$\phi$ to 22 mm$\phi$, in which both EGR rate and air-fuel ratio can be finely controlled. A valve effective area of the small-diameter valve $6f$ of this range is 9.5% to 26.5% of a necessary passage cross sectional area at the time of the maximum total flow rate of the exhaust gas. Introduction of FIG. 2 will be described later.

According to this configuration, by making the valve effective area of the small-diameter valve in a range of 9.5% to 26.5%, both air-fuel ratio and EGR rate can be finely controlled. When the small-diameter valve effective area is smaller than 9.5%, the variation of the air-fuel ratio (A/F) decreases against the valve opening and the control range of the air-fuel ratio becomes narrower. And at the same time, the valve opening of the minimum air-fuel ratio decreases, so that the controllability is deteriorated. When the valve effective area is larger than 26.5%, valve opening of the minimum EGR rate decreases, and valve opening comes to have less controllability, so that controllability is deteriorated.

Furthermore, in the above two-stage supercharging system for the internal combustion engine, the small-diameter valve of the high-pressure-stage exhaust bypass passage is formed by a swing-type on-off valve with an arm to be configured in such a way that valve opening is in a range of 15 to 20 degrees, which is an arm angle of the minimum EGR rate.

By forming the valve with the swing-type on-off valve with an arm, it is possible to enhance durability against a high-temperature gas. At the same time, the size of the bypass valve can be made small, so that the valve can be easily arranged in the engine.

In addition, the above two-stage supercharging system for the internal combustion engine is configured to realize a fully open condition of the valve with valve opening of the arm of the small-diameter valve being in a range of 15 to 20 degrees. With this configuration, exhaust gas flow rate in the small-diameter valve can be finely precisely controlled.

ADVANTAGES OF THE INVENTION

According to the two-stage supercharging system of the present invention, the high-pressure-stage exhaust bypass passage is formed by a plurality of bypass passages composed of a first bypass passage having a small-diameter valve and other at least one bypass passage having a large-diameter valve larger than the small-diameter valve, and a valve effective area of the small-diameter valve is made to be in a range of 9.5% to 26.5% against a necessary passage cross sectional area at the time of the maximum total flow rate of the exhaust gas. Accordingly, through this configuration, when the bypass valve is closed, the pressure at the high-pressure-stage turbine intake rises and the EGR rate increases, while when the bypass valve is opened, the EGR rate decreases. As a result, both the air-fuel ratio and EGR rate can be finely controlled.

Therefore, in the two-stage supercharging system having the high-pressure-stage and low-pressure-stage turbochargers, according to operation conditions of the internal combustion engine, flow rate of the exhaust gas flowing into the high-pressure-stage turbine can be precisely controlled and suitable supercharging can be conducted under each operation condition.

Thereby, at the time of high-speed and high-load operation, the total exhaust gas flow rate can be made to flow into the low-pressure-stage turbine by bypassing the high-pressure-stage turbine, and it is possible to supercharge without increasing a pumping loss. At the same time, when in medium-speed and medium-load operation, using both the high-pressure-stage and low-pressure-stage turbochargers, it is possible to supercharge while finely controlling the EGR rate and air-fuel ratio by controlling the bypass valve. In addition, at the time of the low-speed and low-load operation, it is possible to supercharge by finely controlling the exhaust gas flow rate flowing in the high-pressure-stage turbine.

DETAILED DESCRIPTION OF THE INVENTION

With reference to drawings, descriptions will be given to the two-stage supercharging system for the internal combustion engine according to the present invention.

Figure 1:
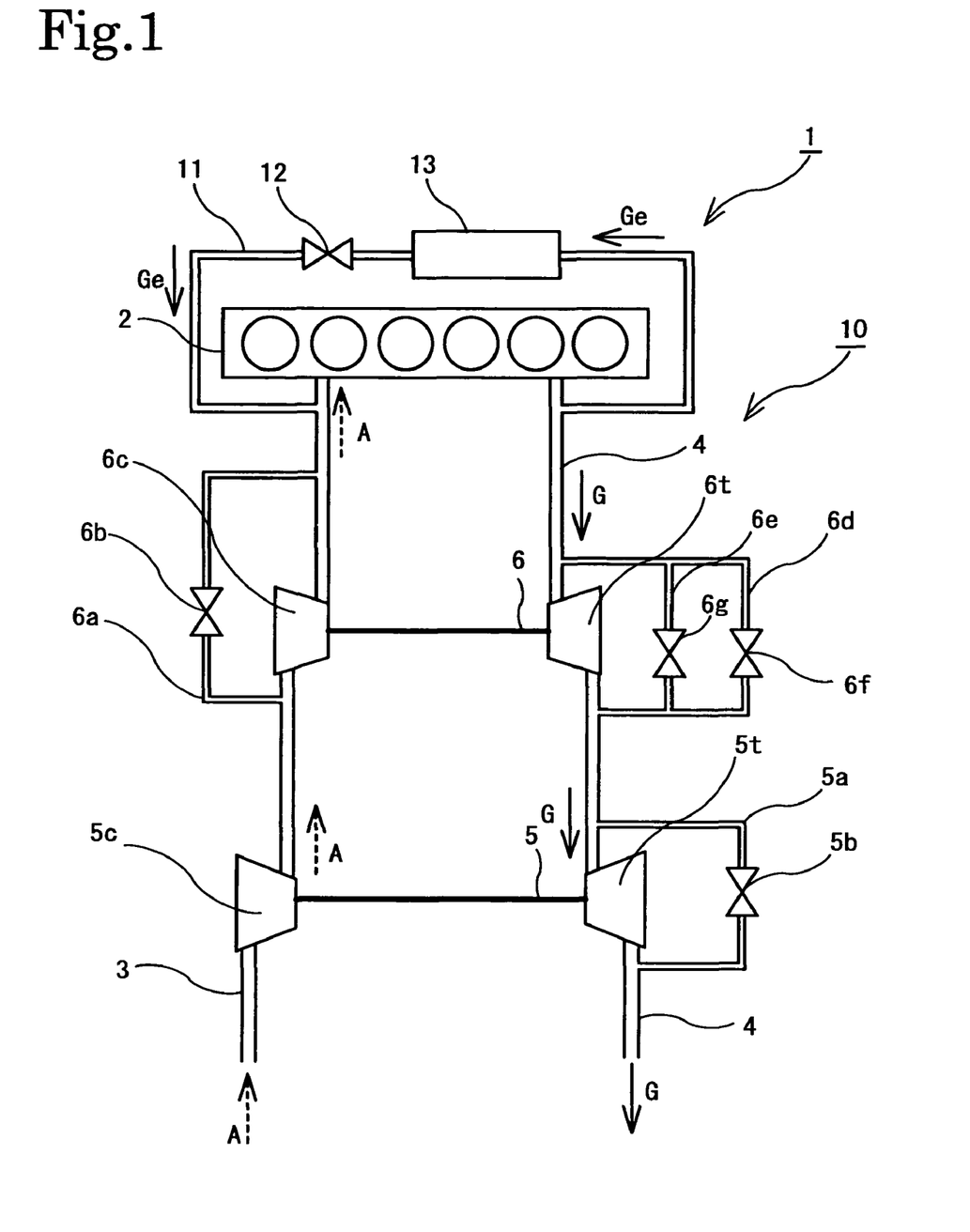
FIG. 1 is a block diagram showing a two-stage supercharging system for an internal combustion engine according to the present invention.

As shown by FIG. 1, in the two-stage supercharging system 10, from an upstream of an intake air passage 3 of an engine (internal combustion engine) 1 in order, a low-pressure-stage compressor 5c of a low-pressure-stage turbocharger 5 and high-pressure-stage compressor 6c of a high-pressure-stage turbocharger 6 are provided. At the same time, from an upstream of an exhaust passage 4 in order, a high-pressure-stage turbine 6t of a high-pressure-stage turbocharger 6 and low-pressure-stage turbine 5t of a low-pressure-stage turbocharger 5 are provided.

In the low-pressure-stage turbocharger 5, a low-pressure-stage exhaust bypass passage 5a is provided for bypassing the low-pressure-stage turbine 5t. In the low-pressure-stage exhaust bypass passage 5a, a waste gate valve 5b is attached to control the amount of the flowing gas.

In the high-pressure-stage turbocharger 6, in the intake air system, a high-pressure-stage intake air bypass passage 6a is provided for bypassing the high-pressure-stage compressor 6c. In the high-pressure-stage intake air bypass passage 6a, a high-pressure-stage intake air bypass valve 6b is attached to control the amount of the flowing gas.

Further, in the exhaust system, high-pressure-stage exhaust bypass passages 6d and 6e are provided for bypassing a high-pressure-stage turbine 6t. In the high-pressure-stage exhaust bypass passages 6d and 6e, high-pressure-stage exhaust bypass valves 6f and 6g are attached to control the amount of the flowing gas.

That is, the high-pressure-stage exhaust bypass passage 6d and 6e are formed by the first bypass passage 6d having a small-diameter valve 6f and second bypass passage 6e having a large-diameter valve 6g, whose diameter is larger than the small-diameter valve 6f.

Regarding the EGR, an EGR passage 11 having an EGR valve 12 and EGR cooler 13 is provided by connecting an exhaust passage 4 between the high-pressure-stage turbine 6t and engine body 2 and an intake air passage 3 between the high-pressure-stage compressor 6c and engine body 2. Through the EGR passage 11, an EGR gas Ge is introduced from the exhaust passage 4 in the upstream of the high-pressure-stage turbine 6t to the intake air passage 3 in the downstream of the high-pressure-stage compressor 6c via an EGR valve 12 and EGR cooler.

And in the present invention, a valve effective area of the small-diameter valve 6f of the first bypass passage 6d of the high-pressure-stage exhaust bypass passage is configured to be in a range of 9.5% to 26.5% of a necessary passage cross sectional area at the time of the maximum total flow rate of the exhaust gas. That is, the valve effective area of the small-diameter valve 6f of the first bypass passage 6d is configured to be in a range of 9.5% to 26.5% of the valve effective area of the small-diameter valve 6f and that of the large-diameter valve 6g. Through this configuration, both air-fuel ratio and EGR rate come to be able to be finely controlled.

These small-diameter valve 6f and large-diameter valve 6g are formed by a swing-type on-off valve with an arm, and the arm angle is configured to be in a range of 15 to 20 degrees when the EGR rate becomes minimum. Through this configuration, the bypass valve can have excellent heat tolerance. In addition, since the bypass valve size can be made small, the valve can be easily arranged in the engine.

It is configured that with the opening of the arm of the small-diameter valve 6f being in a range of 15 to 20 degrees, the valve full open state is realized. Through this configuration, the exhaust gas flow rate in the small-diameter valve can be finely precisely controlled. In addition, since the large-diameter valve 6g does not conduct fine flow rate control, it is allowable if the valve can move from fully closed to fully open.

And according to operation conditions of the engine 10, control is conducted as follows. In premix combustion at the time of low-speed and low-load, all valves 6f and 6g are closed in the high-pressure-stage exhaust bypass passages 6d and 6e. At the time of medium-speed and medium-load, the large-diameter valve 6g except the small-diameter valve 6f is closed and the small-diameter valve 6f is gradually opened. In the conventional combustion (diffusion combustion) at the time of high-speed and high-load, control to open all valves 6f and 6g is conducted.

Figure 3:
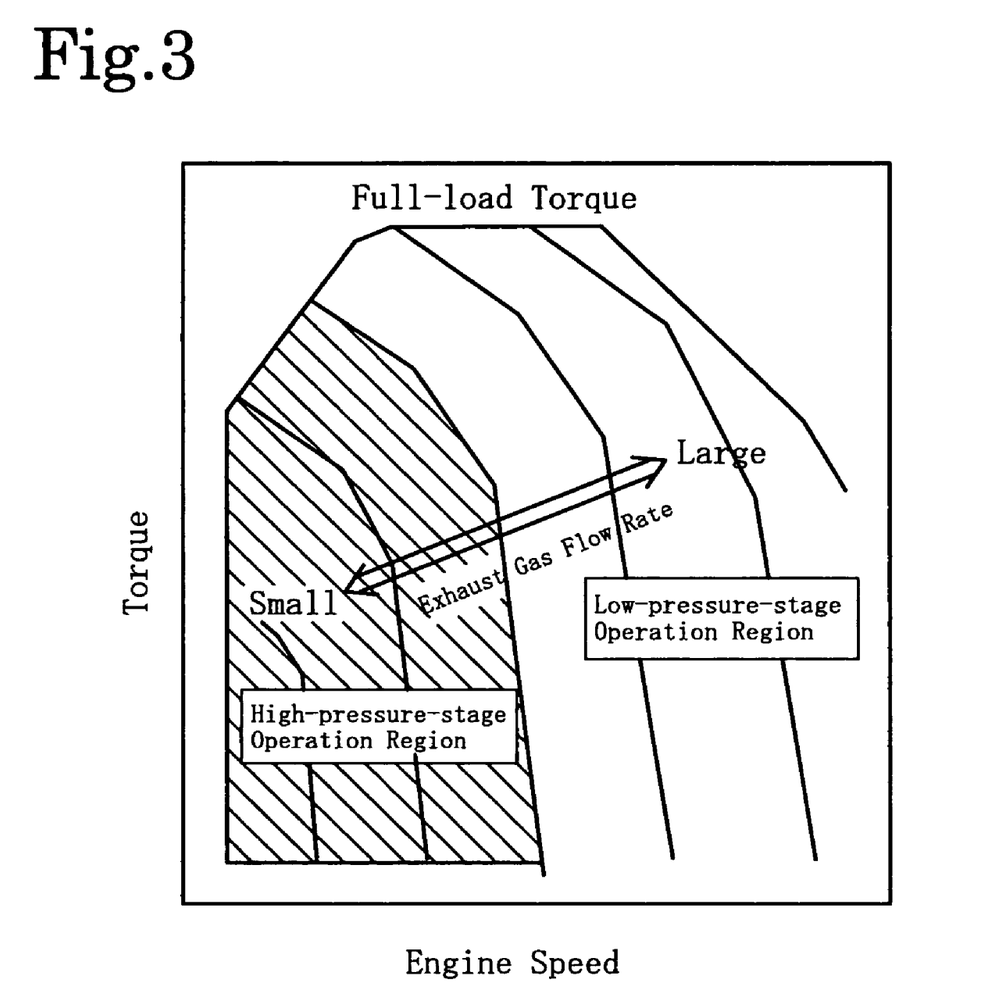
FIG. 3 is a diagram showing relations of the exhaust gas flow rate, high-pressure-stage operation region, and low-pressure-stage operation region against a rotation speed and torque of the engine in the two-stage supercharging system.
Figure 4:
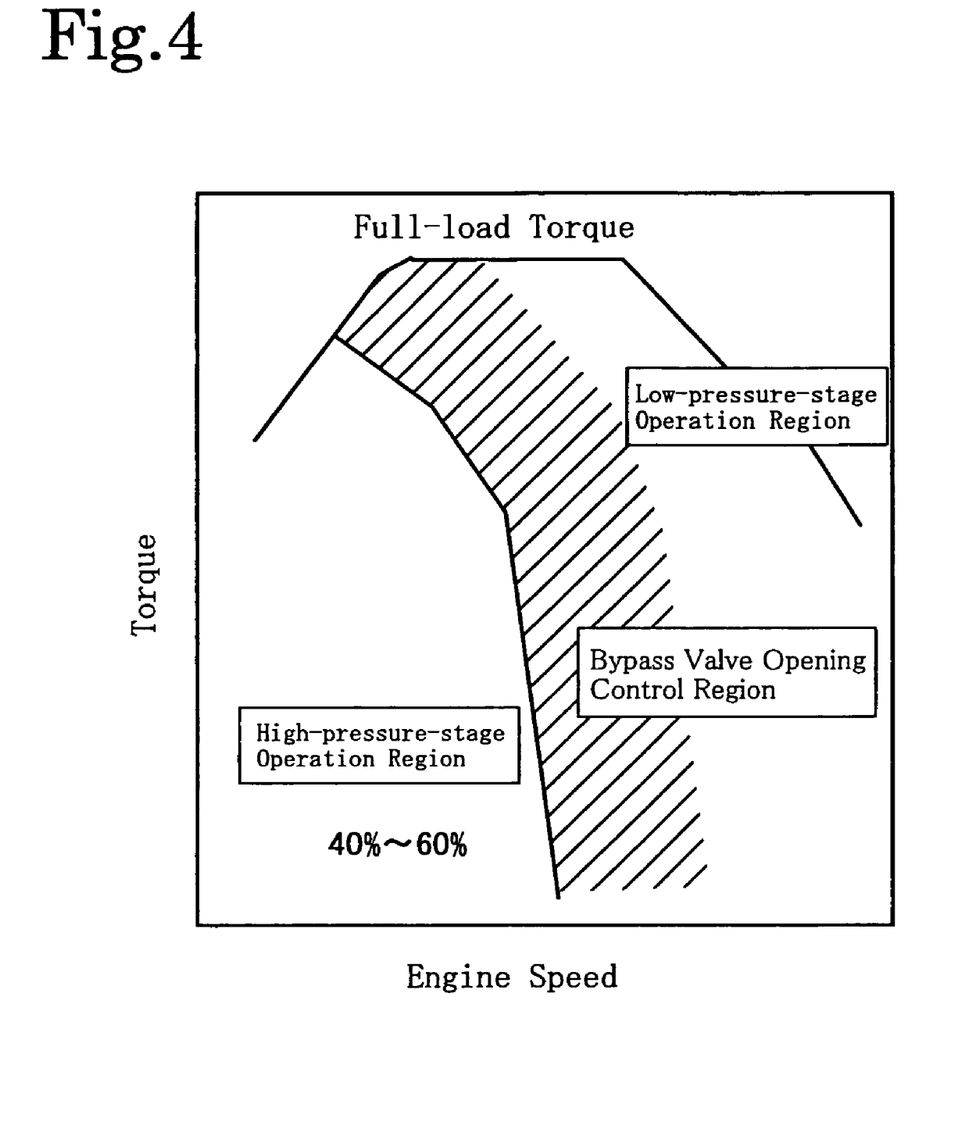
FIG. 4 is a diagram showing relations of the exhaust gas flow rate, high-pressure-stage operation region, and low-pressure-stage operation region against the rotation speed and torque of the engine when capacity ratio of the low-pressure-stage and high-pressure-stage of turbines in passenger cars and compact cars and the like is 40% to 60%.
Figure 5:
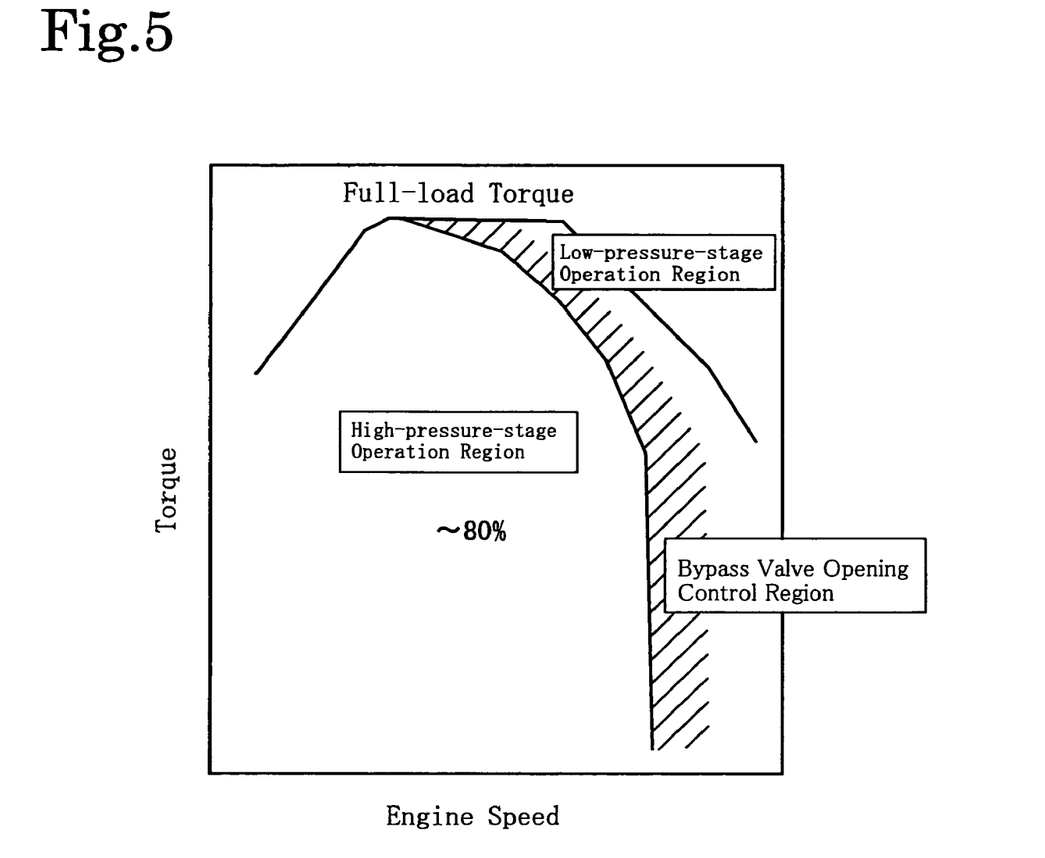
FIG. 5 is a diagram showing relations of the exhaust gas flow rate, high-pressure-stage operation region, and low-pressure-stage operation region against the rotation speed and torque of the engine when capacity ratio of the low-pressure-stage and high-pressure-stage of turbines in heavy-duty trucks and the like is 80%.

FIGS. 3 to 5 schematically show the exhaust gas flow rate against a rotation speed and torque of engine reflecting operation conditions of the engine. As shown by FIG. 3, when the exhaust gas flow rate is small at the time of low-speed and low-load, the engine is in the operation region of the high-pressure-stage turbocharger and when the exhaust gas flow rate is large, it is in the operation region of the low-pressure-stage turbocharger.

As shown by FIGS. 4 and 5, a control region of the bypass valve opening (hatching part) at the time of medium-speed and medium-load is provided in a transition part from the high-pressure-stage operation region to the low-pressure-stage operation region. In the control region of the bypass valve opening, while the large-diameter valve 6g is closed and the second bypass passage 6e is closed, the small-diameter valve 6f is gradually opened with the increase of the amount of the exhaust gas. Thereby, using the first bypass passage 6d, the engine gradually transits from the operation region of the high-pressure-stage turbocharger to that of the low-pressure-stage turbocharger.

FIG. 4 shows operation region when the capacity ratio of the low-pressure-stage and high-pressure-stage turbines of passenger cars, compact cars, and the like is 40 to 60%. FIG. 5 shows operation region when the capacity ratio of the low-pressure-stage and high-pressure-stage turbines of such as large trucks is 80%.

On the other hand, when operation conditions of the engine is in the operation region from low-speed and low-load to medium-speed and medium load, the high-pressure-stage intake air bypass valve 6b is closed, intake air is made to flow into the high-pressure-stage compressor 6c, and with the low-pressure-stage compressor 5c, the supercharging is conducted under these two stages.

When operation conditions of the engine is in the high-speed and high-load operation region, the high-pressure-stage intake air bypass valve 6b is opened, intake air is made to flow into the high-pressure-stage intake air bypass passage 6a, and the high-pressure-stage compressor 6c is made to be bypassed. In this case, the supercharging is conducted only by the low-pressure-stage compressor 5c.

In the EGR control, by controlling the EGR valve 12 of the EGR passage 11, optimal EGR is conducted for each operation condition. Based on the detected rotation speed and load of the engine, it is determined whether the operation condition of the engine 1 is in the operation region of the EGR, referring to map data for control prepared in advance. The EGR rate when conducting EGR is also calculated based on the detected rotation speed and load of the engine, referring to map data for control prepared in advance. Each of the valve 5b, 6b, 6f, and 6g of the supercharging system 10 and EGR valve 12 is controlled, so that the EGR rate is achieved.

Therefore, according to the above two-stage supercharging system 10, since the valve effective area of the small-diameter valve is made to be in a range of 9.5% to 26.5% of a necessary passage cross sectional area at the time of the maximum total flow rate of the exhaust gas, both air-fuel ratio and EGR rate can be finely controlled.

Therefore, in the two-stage supercharging system 10 having the high-pressure-stage turbocharger 6 and low-pressure-stage turbochargers 5 according to the operation conditions of the engine 1, the flow rate of the exhaust gas flowing into the high-pressure-stage turbine 6t can be precisely controlled and suitable supercharging can be easily done under each operation condition.

Thereby, at the time of the high-speed and high-load operation, total flow rate of the exhaust gas is made to flow into the low-pressure-stage turbine 5t by bypassing the high-pressure-stage turbine 6t, so that supercharging is possible without increasing a pumping loss. When in the medium-speed and medium-load operation, using both high-pressure-stage turbocharger 6 and low-pressure-stage turbochargers 5, it is possible to supercharge while finely controlling the EGR rate and air-fuel ratio by the control of the small-diameter valve 6f. At the time of the low-speed and low-load operation, it is possible to supercharge by finely controlling the exhaust gas flow rate flowing in the high-pressure-stage turbine.

Next, descriptions will be given to that it is optimal that a valve effective area of the small-diameter valve is made to be in a range of 9.5% to 26.5% of a necessary passage cross sectional area at the time of the maximum total flow rate of the exhaust gas.

Figure 6:
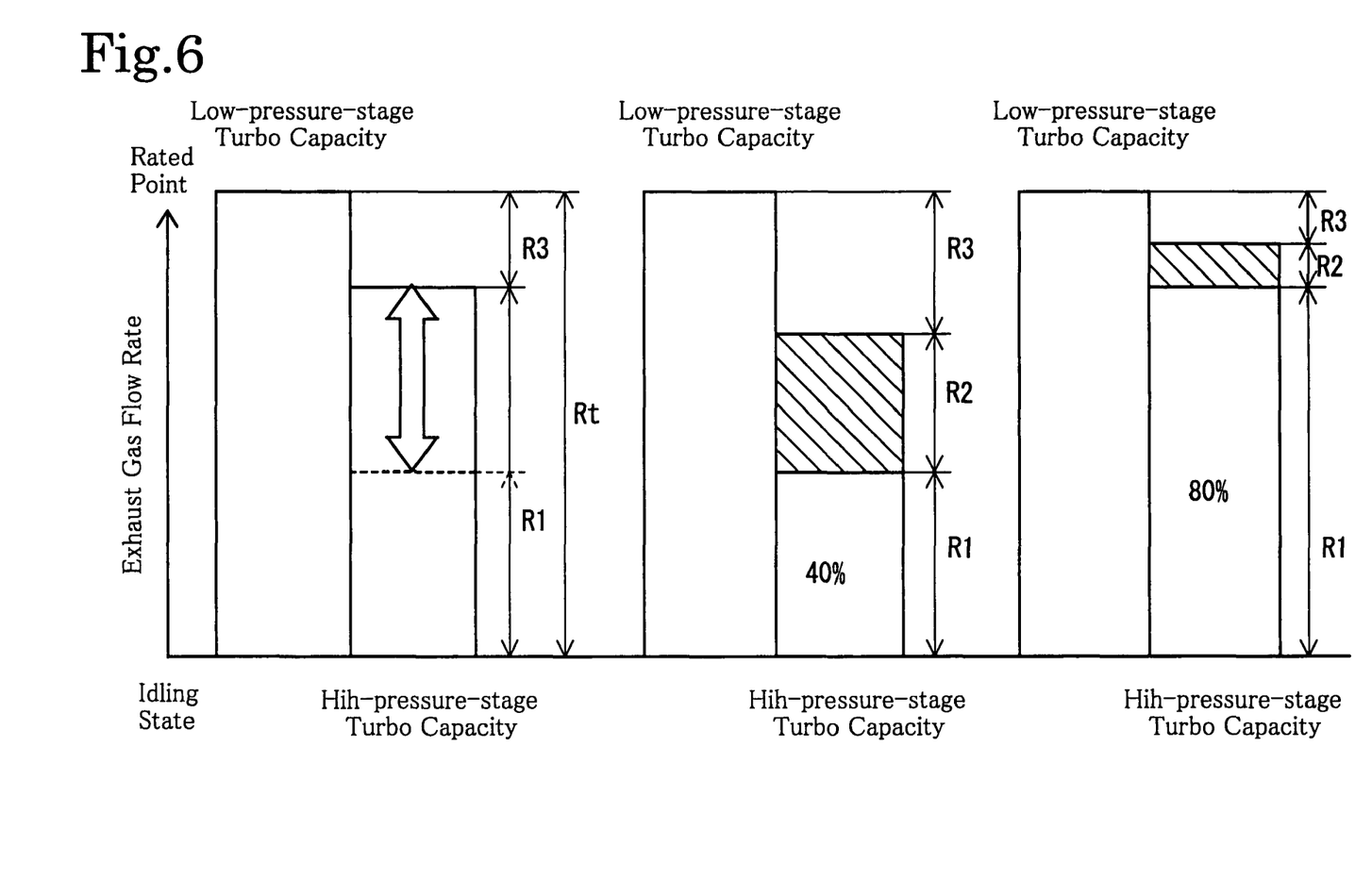
FIG. 6 is a diagram showing relations of capacities of the high-pressure-stage and low-pressure-stage turbochargers and exhaust gas flow rate in the high-pressure-stage exhaust bypass passage.

FIG. 6 is a diagram showing relations of the capacity (R1) of the high-pressure-stage turbocharger, capacity (Rt) of the low-pressure-stage turbocharger, and flow rate adjustment (R2) of the exhaust gas in the high-pressure-stage exhaust bypass passages 6d and 6e. As shown in the left of FIG. 6, in a practical range, the capacity (R1) of the high-pressure-stage turbocharger is within the range of 40% to 80% of the capacity (Rt) of the low-pressure-stage turbocharger. In the middle of FIG. 6, a case is shown, in which the capacity (R1) of the high-pressure-stage turbocharger is 40% of the capacity (Rt) of the low-pressure-stage turbocharger. The right of FIG. 6 shows the case, in which the capacity (R1) of the high-pressure-stage turbocharger is 80% of the capacity (Rt) of the low-pressure-stage turbocharger.

Result of a simulation calculation under these conditions shows that when adjusting in a single passage by a single valve, flow rate adjustment control is difficult at the time of small flow rate. When making the valve diameter small so as to make it easy to adjust flow rate at the time of small flow rate, since control range of the flow rate adjustment is limited, it is found that there exists an optimal value in the valve diameter. It is found that when considering controllability in the range of the exhaust gas flow rate (R2+R3) exceeding the capacity (R1) of the high-pressure-stage turbocharger, a preferable control range (hatching) is the half capacity (R2=R3) of the differences (R2+R3) of the turbo capacity. Taking the above into consideration, it is preferable that an area rate of the small-diameter valve 6f should be 10 to 30% if only flow rate range is considered.

Figure 7:
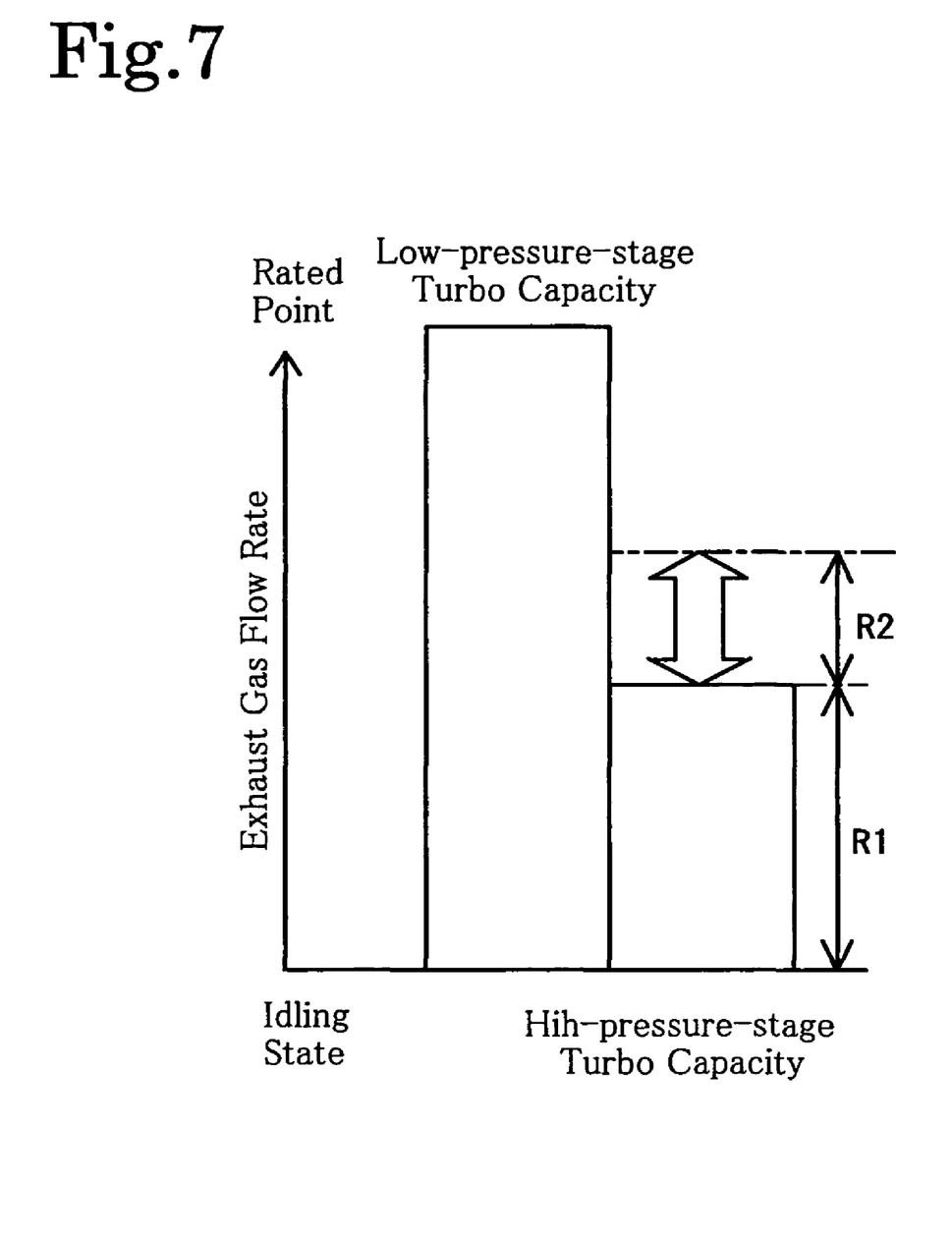
FIG. 7 is a diagram showing a range of an exhaust gas flow rate and opening and closing control of the bypass valve.

FIG. 7 shows conditions of control, considering the above. When the exhaust gas flow rate is in the low-speed and low-load operation region in the capacity (R1) of the high-pressure-stage turbocharger, it is possible to control the air-fuel ratio (A/F) and EGR rate by opening and closing control of the bypass valves 6f and 6g. However, it is preferable to control them with the bypass valves 6f and 6g being closed because high air-fuel ratio and high EGR rate are desired.

On the other hand, when the exhaust gas flow rate is in the medium-speed and medium-load operation region exceeding the capacity (R1) of the high-pressure-stage turbocharger, since exhaust pressure rises because of a poor efficiency of the high-pressure-stage turbocharger and fuel efficiency deteriorates, the air-fuel ratio (A/F) and EGR rate are controlled by opening and closing the bypass valves 6f and 6g. The flow rate control range (R2) by the bypass valves 6f and 6g is 10 to 30%.

Figure 8:
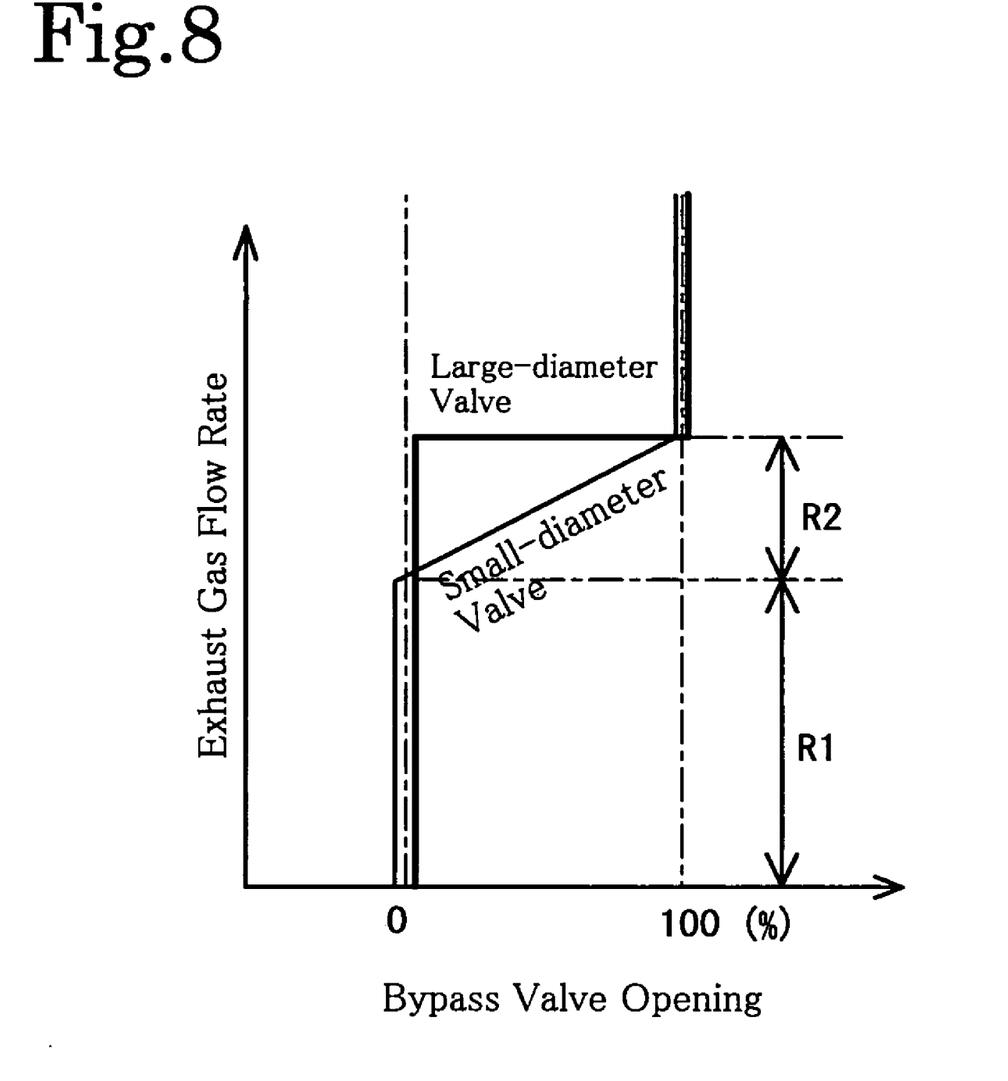
FIG. 8 is a diagram showing a relation of the valve opening of the bypass valve and exhaust gas flow rate.

Next, the relation between the valve opening of the bypass valve and exhaust gas flow rate is considered. FIG. 8 shows a typical relation. As long as the exhaust flow rate is in R1, both the valve openings of the small-diameter valve 6f and large-diameter valve 6g are 0%. While the exhaust gas flow rate is in R1 to (R1+R2), the valve opening of the large-diameter valve 6g is 0% and the valve remains closed, however the valve opening of the small-diameter valve 6f is adjusted between 0% to 100% and flow rate in the range of R2 is adjusted. When the exhaust gas flow rate exceeds (R1+R2), the valve opening of the small-diameter valve 6f and large-diameter valve 6g is specified as 100%. Thereby, both the first and second bypass passages 6d and 6e are opened.

Figure 9:
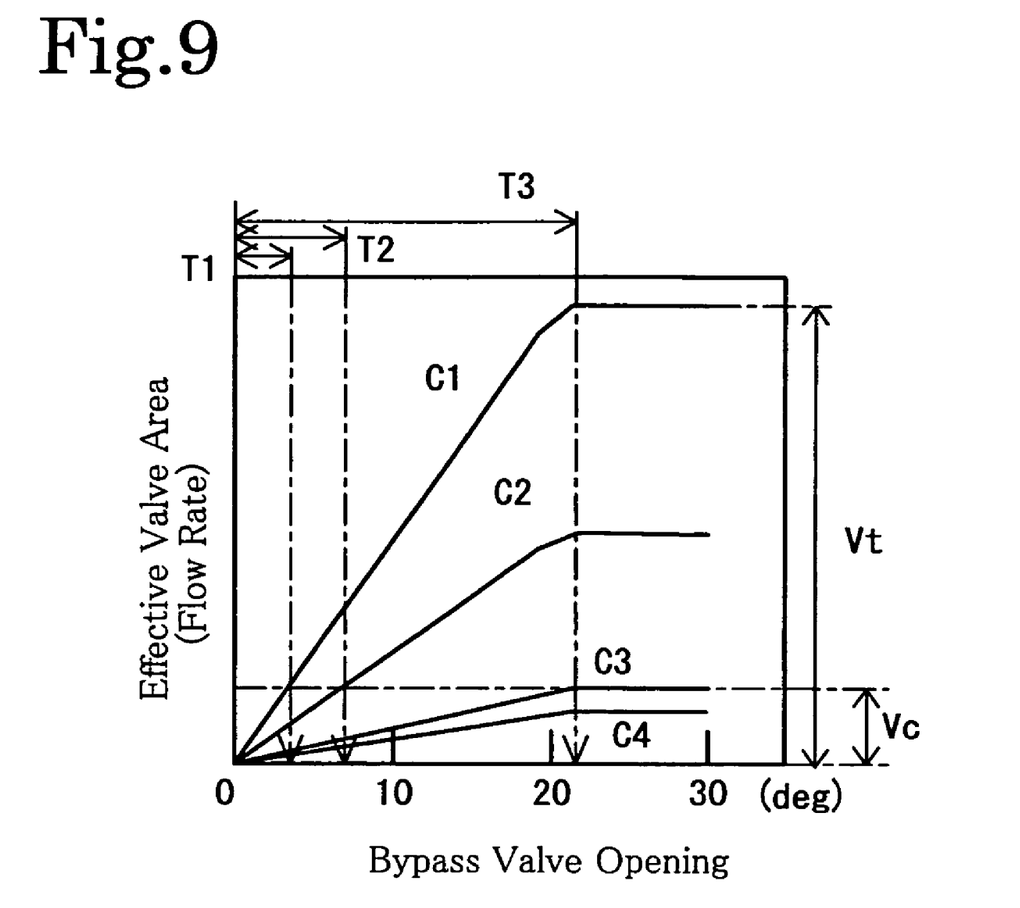
FIG. 9 is a diagram showing a relation of the valve opening of the bypass valve and valve effective area.
Figure 14:
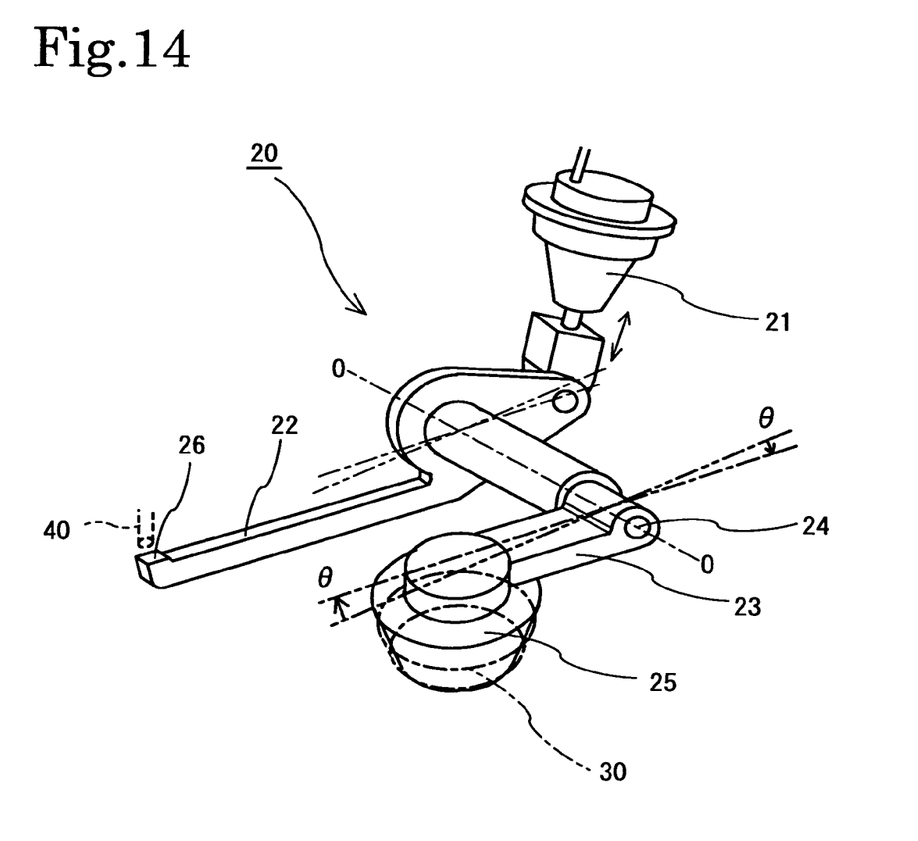
FIG. 14 is a diagram showing a configuration of a swing-type on-off valve with an arm.

Next, FIG. 9 shows the bypass valve opening and valve effective area (flow rate). This is a graph, in which a swing type on-off valve with an arm as typically shown by FIG. 14 is employed for bypass valves 6f and 6g. This is a graph showing the valve opening and valve effective area of each diameter of the small-diameter valve 6f when performing geometric calculation on the effective area of the bypass valve.

In the swing type on-off valve with an arm 20 of FIG. 14, when an actuator 21 expands and contracts against an opening (valve sheet) 30 denoted by a dashed line, the first arm 22 and second arm 23 revolve about a rotation axis 24 by the valve opening θ degree. Then, a valve plug 25 on the tip of the second arm 23 moves in and out of the opening 30, so that the valve effective area changes and the exhaust gas flow rate is adjusted. In addition, at the tip of the first arm 22, an abutting part 26 is provided abutting on a stopper 40.

Case 1 (C1) shows the bypass valve of 42 mmφ alone, that is, when the valve effective area of the large-diameter valve 6b is 100% of the necessary flow path area. Case 2 (C2) shows two bypass valves of 30 mmφ, that is, when the valve effective areas of the small-diameter valve 6f and large-diameter valve 6g are 50% of the necessary flow path area, respectively. Case 3 (C3) shows bypass valves of 20 mmφ and 37 mmφ, that is, when the valve effective areas of the small-diameter valve 6f and large-diameter valve 6g are 20% and 80% of the necessary flow path area, respectively.

When performing flow rate control with one bypass valve like Case 1 (C1), since flow rate Vc necessary for performing flow rate control of the bypass valve is small against a total flow rate (Vt) of the exhaust gas, it is required to perform flow rate control within a range T1 of the valve opening of approximately four degrees.

On the contrary, in the use of both valves of the same diameter like Case 2 (C2), it is possible to perform flow rate control using a range T2 of the valve opening of approximately seven degrees. Additionally, when selecting the bypass valve having an optimal diameter like Case 3 (C3), it is possible to perform flow rate control using a range T3 of the valve opening of approximately twenty degrees.

When the small-diameter valve 6f is smaller (C4) than Case 3 (C3), since the maximum flow rate capable of adjusting the exhaust gas flow rate becomes small, all ranges of the flow rate Vc needing the flow rate adjustment of the bypass valve cannot be adjusted and controlled.

Figure 10:
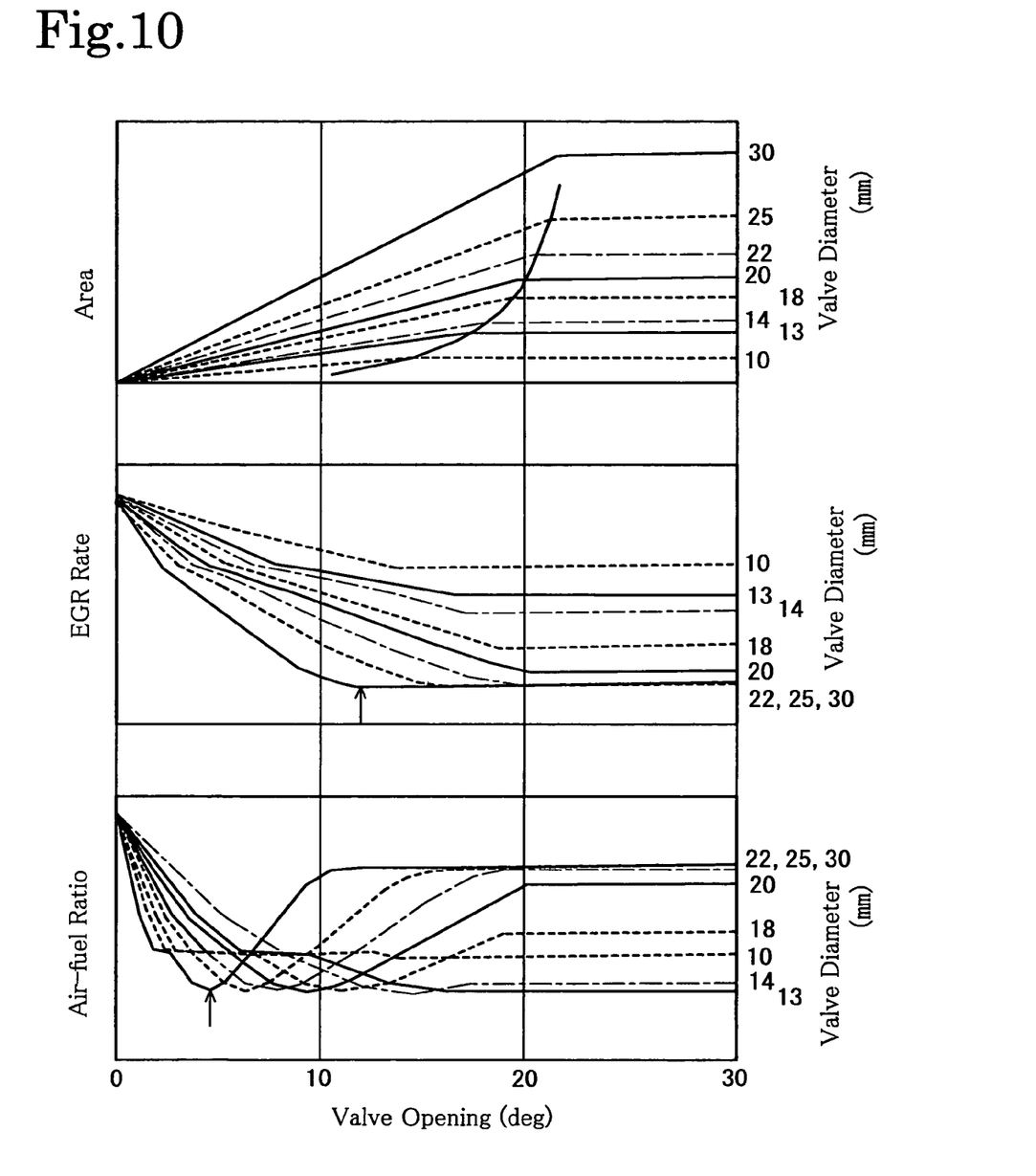
FIG. 10 is a diagram showing relations of an area (valve effective area), EGR rate, and air-fuel ratio when changing a valve diameter.

FIG. 10 shows relations of the area (valve effective area), EGR rate, and air-fuel ratio when valve diameters are 10, 13, 14, 18, 20, 22, 25, and 30 mmφ. Arrowed parts of the EGR rate and air-fuel ratio of FIG. 10 are taken out. Then, FIG. 2 shows normalized values (◇: diamond shape) of variations of the EGR rate and air-fuel ratio from the valve opening 0 degree divided by each maximum variation, respectively, with the valve diameter being the horizontal axis. In addition, valve openings (□: square) having minimum EGR rate and air-fuel ratio are shown.

From FIG. 2, a range of the valve diameter is obtained as follows, in which both EGR rate and air-fuel ratio can be finely controlled. When the valve diameter is smaller than 13 mmφ, not only the control range of the air-fuel ratio reduces but also the controllability deteriorates. When it is larger than 22 mmφ, as for the EGR rate, resolution of angle of the valve opening is lowered and the controllability deteriorates. Accordingly, the range of the appropriate valve diameter is 13 to 22 mmφ. The valve effective area of the small-diameter 6f in this range becomes 9.5% to 26.5% against the necessary flow passage cross sectional area at the time of the maximum total flow rate of the exhaust gas. This is the preferable range for the valve diameter.

Figure 11:
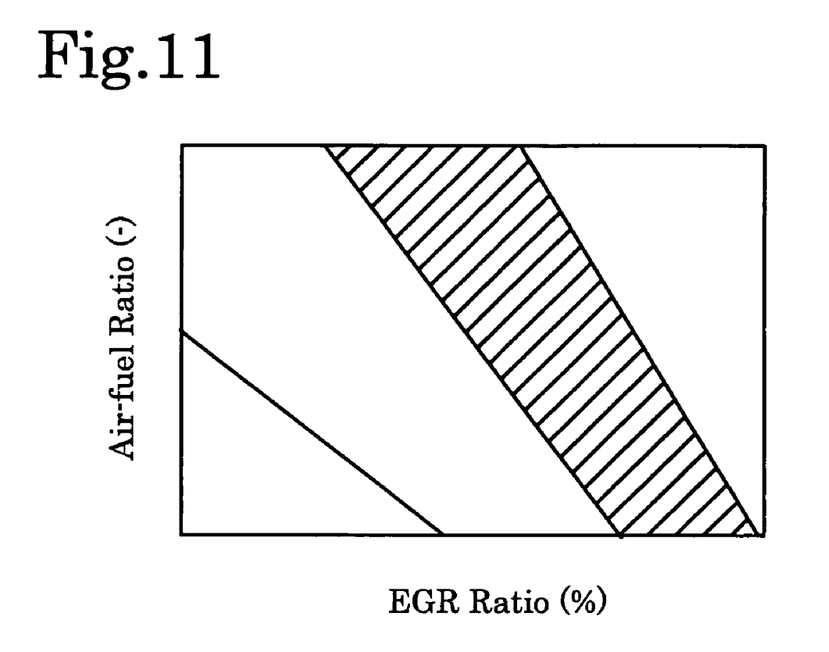
FIG. 11 is a diagram showing a controllable range of the EGR rate and air-fuel ratio when the diameter of the small-valve is 10 mmφ.
Figure 12:
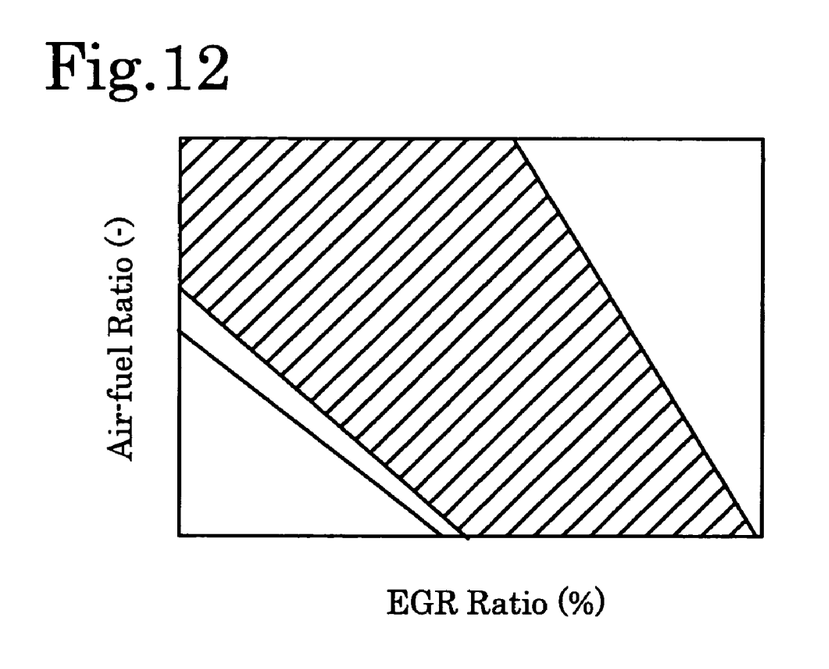
FIG. 12 is a diagram showing a controllable range of the EGR rate and air-fuel ratio when the diameter of the small-valve is 20 mmφ.
Figure 13:
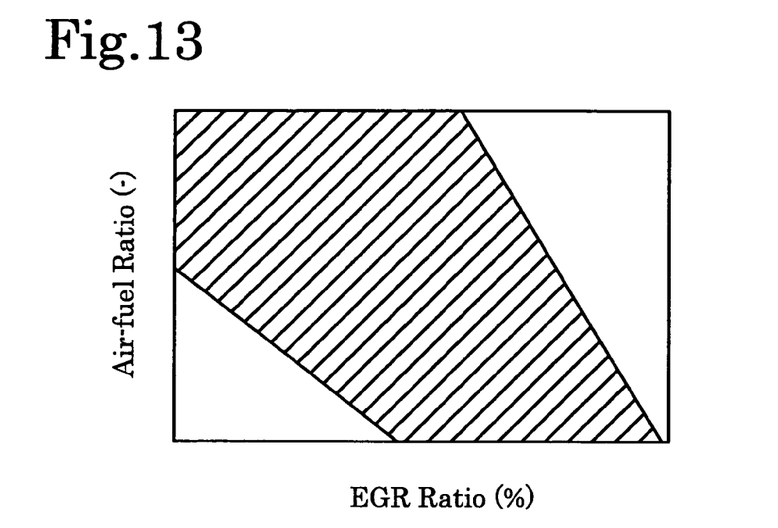
FIG. 13 is a diagram showing a controllable range of the EGR rate and air-fuel ratio when the diameters of both the small-valve and the large-valve are 30 mmφ.

FIGS. 11 to 13 show controllable ranges of the EGR rate and air-fuel ratio. FIG. 11 shows the controllable range (hatching part) of the EGR rate and air-fuel ratio with the small-diameter valve 6f being 10 mmφ. The range becomes less than half of the controllable range (hatching part) with both small-diameter valve 6f and large-diameter valve 6g shown by FIG. 13 being 30 mmφ. FIG. 12 shows a controllable range (hatching part) of the EGR rate and air-fuel ratio when the small-diameter valve 6f is 20 mmφ. The range can almost cover the controllable range (hatching part) with both small-diameter valve 6f and large-diameter valve 6g being 30 mmφ shown in FIG. 13.

Consequently, from results above, as a configuration capable of finely controlling the EGR rate and air-fuel ratio and expanding the controllable range of the EGR rate and air-fuel ratio, it is optimal that the valve effective area of the small-diameter valve 6f is configured to be in a range of 9.5% to 26.5% of the necessary passage cross sectional area at the time of the maximum total flow rate of the exhaust gas.

INDUSTRIAL APPLICABILITY

The two-stage supercharging system for the internal combustion engine having an excellent effect mentioned above according to the present invention can be highly effectively utilized for many internal combustion engines such as in-vehicle internal combustion engine.

What is claimed is:
1. A two-stage supercharging system for an internal combustion engine comprising:
a low-pressure-stage compressor of a low-pressure-stage turbocharger and a high-pressure-stage compressor of a high-pressure-stage turbocharger are provided from an upstream of an intake air passage of the internal combustion engine in order, and at the same time, a high-pressure-stage turbine of the high-pressure-stage turbocharger and a low-pressure-stage turbine of the low-pressure-stage turbocharger are provided from the upstream of an exhaust passage in order, a high-pressure-stage intake air bypass passage bypassing the high-pressure-stage compressor and a high-pressure-stage exhaust bypass passage bypassing the high-pressure-stage turbine are provided, and in the two-stage supercharging system for the internal combustion engine, the high-pressure-stage exhaust bypass passage being composed of a first bypass passage provided with a small-diameter valve and a second bypass passage provided with a large-diameter valve larger than the small-diameter valve, wherein, a valve effective area of the small-diameter valve is configured to be in a range of 9.5% to 26.5% of a necessary passage cross sectional area at the time of a maximum total flow rate of the exhaust gas.

2. The two-stage supercharging system for the internal combustion engine according to claim 1 wherein, the small-diameter valve of the high-pressure-stage exhaust bypass passage is formed by a swing-type on-off valve with an arm and a valve opening is specified as 15 to 20 degrees, each valve opening being an arm angle at the time of a minimum EGR rate.

3. The two-stage supercharging system for the internal combustion engine according to claim 2 wherein, with the valve opening of the arm of the small-diameter being in a range of 15 to 20 degrees, a valve full-open state is achieved.

* * * * *